July 30, 1929.  F. G. WHITTINGTON  1,722,779
STEERING WHEEL DRIVE FOR TRAVEL INDICATORS
Filed Feb. 17, 1926  2 Sheets-Sheet 1
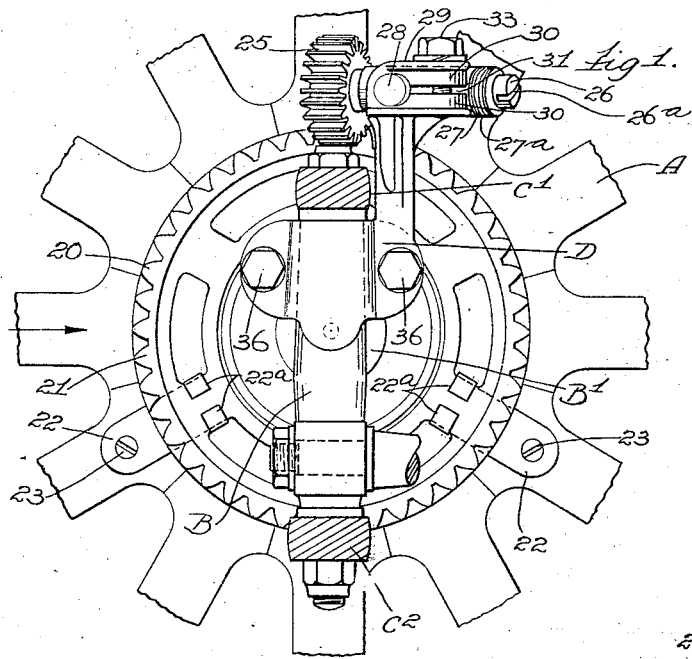
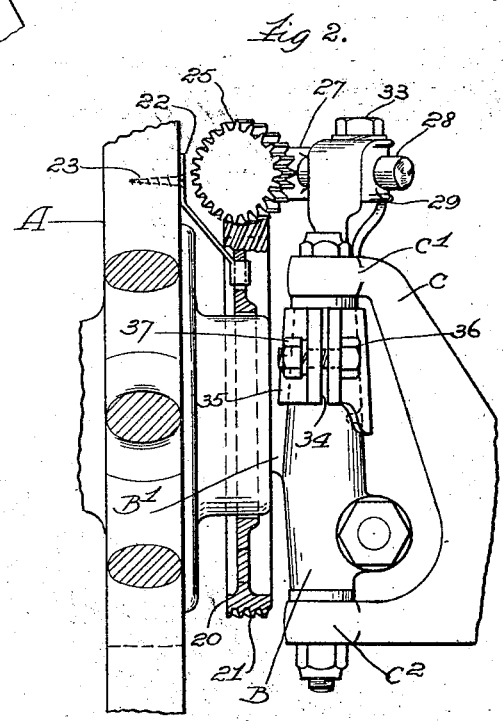
Witness.
H. O. McKnight.
Inventor:
Frederik G. Whittington,
by Burton & Burton
his Attorneys.

July 30, 1929.　　F. G. WHITTINGTON　　1,722,779
STEERING WHEEL DRIVE FOR TRAVEL INDICATORS
Filed Feb. 17, 1926　　2 Sheets-Sheet 2
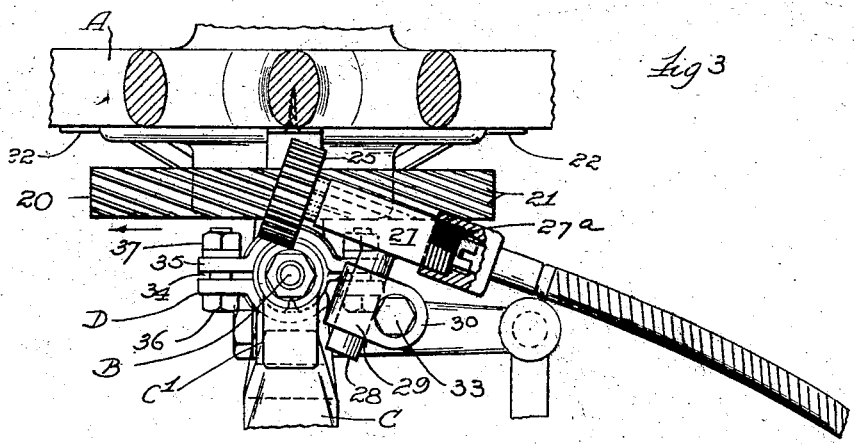
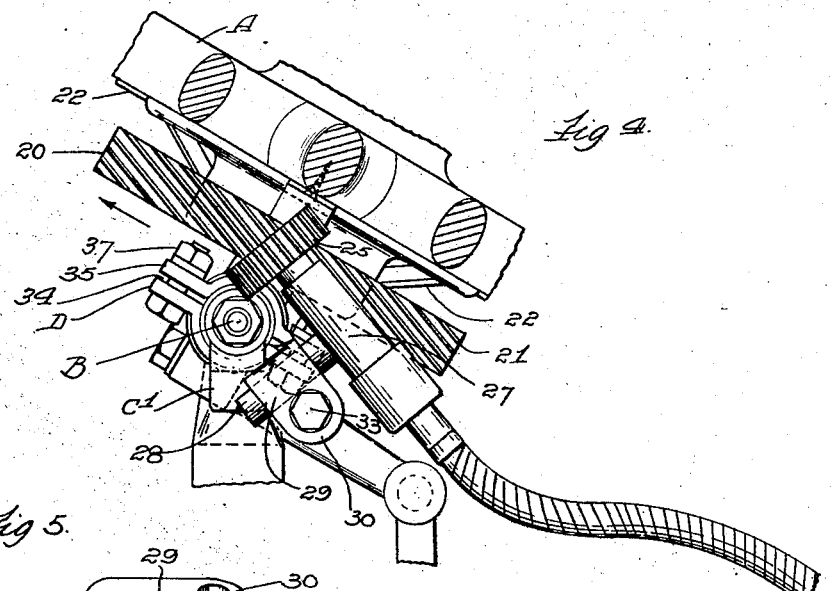
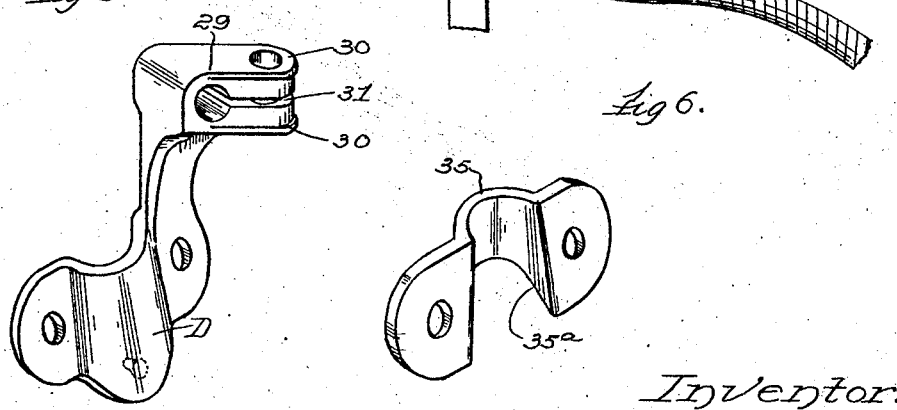
Inventor.
Frederik G. Whittington
by Burton & Burton
his Attorneys.

Patented July 30, 1929.

1,722,779

UNITED STATES PATENT OFFICE.

FREDERIK G. WHITTINGTON, OF CHICAGO, ILLINOIS, ASSIGNOR TO STEWART-WARNER CORPORATION, OF CHICAGO, ILLINOIS, A CORPORATION OF VIRGINIA.

STEERING-WHEEL DRIVE FOR TRAVEL INDICATORS.

Application filed February 17, 1926. Serial No. 88,748.

The purpose of this invention is to provide an improved mounting and driving connection for driving from the steering wheel of a motor vehicle, a speed or mileage indicating or recording instrument and the like. It consists in the elements and features of construction shown and described as indicated in the claims.

In the drawings:

Figure 1 is an inner side elevation of a steering wheel of an automobile together with the knuckle member on whose journal or spindle the wheel is journaled, equipped with the devices embodying this invention.

Figure 2 is a view looking in the direction of the arrow 2, on Fig. 2, showing the driving gear on the steering wheel in vertical diametric section.

Figure 3 is a top plan view of the parts shown in Fig. 2 at straight-ahead driving position of the steering wheel.

Figure 4 is a view similar to Fig. 3 with the steering wheel set at an angle for turning a corner.

Figure 5 is a perspective view of one of the members of the bracket structure for mounting the driven pinion.

Figure 6 is a perspective view of a co-operating bracket member.

In the structure illustrated in the drawings the steering wheel is indicated at A, journaled on the spindle, B¹, of the knuckle member, B, the co-operating forked knuckle member constituting the end of the fixed axle being indicated at C, having the spindle, B¹, pivoted in the fork ends, C¹ and C², according to the familiar steering wheel construction.

Mounted rigid and concentric with the steering wheel there is shown a driving gear, 20, which is of the spiral gear type as indicated by the radially projecting tooth, 21, trending obliquely with respect to the plane of the gear. For meshing with and being driven by the gear, 20, the driven pinion, 25, has its spindle or shaft, 26, journaled in a journal bearing, 27, which is formed as the cross arm of a T-shaped member whose stem, 28, is a spindle rotatably and slidably seated in a split slide bearing, 29, which has lugs, 30, 30, projecting from opposite sides of the split as seen at 31, and provided with a clamping bolt and nut, 33, for clamping the spindle stem, 28, in the split bearing in the position to which it may be adjusted by sliding and turning for the purposes hereinafter explained.

The end of the pinion shaft of the spindle, 26, is adapted for coupling to the rotating member of a flexible shaft, as indicated by the axial slot, 26ª; and the end of the journal bearing cross head of the T shaped member, 27, 28, is adapted for coupling to the casing of a flexible shaft, as indicated by its exterior thread seen at 27ª. The split slide bearing, 29, is formed as one terminal of a bracket member indicated in totality by the reference letter, D. This bracket member has at the end opposite the said split side bearing one-half seen at 30 of a two-part or mated clamp for clamping the bracket, D, in position adjusted rotatably and slidably on the knuckle spindle, B¹, said clamp member, 30, and its head, 31, having lugs provided with mated bolt holes for clamping bolts, 32, 32, held by nuts, 33.

From Figures 3 and 4 it will be understood that the pinion, 25, may have its teeth parallel to the axis, notwithstanding it is to mesh with the spiral or oblique toothed driving gear, 20; because said pinion can be journaled with its axis trending in the direction of the spiral or oblique teeth of the driving gear, 25, and at the side at which the pinion is meshed with said driving gear. But it will also be understood that the construction described provides for adjusting the position and axial trend of the pinion, 25, for meshing with a driving gear having spiral teeth of different obliquity within a considerably wide range which may be accommodated by the rotation and sliding adjustment of the bracket, D, on the knuckle spindle, and the co-operating or corrective sliding and rotative adjustment of the spindle stem, 28, of the pinion shaft journal bearing, 27, in the split slide bearing and clamp, 29, of the bracket, D. Also it will be understood that by reason of this adjustment for accommodating the trend of the teeth of the pinion, 25, to that of the spiral tooth of the gear, 20, at the side at which the two gears intermesh, the construction is not limited to employing a pinion having its teeth parallel to its axis.

Accordingly the construction permits the provision of interchangeable gears for mounting on the steering wheel having spiral teeth of different obliquity for co-operating with a given pinion having paraxial teeth as shown; and by this expedient the speed ratio between the gear and pinion may be accommodated to the tread diameter of the steering wheel as the latter may be varied by substitution of a tire of one diameter for one of greater or less diameter. And it will be understood also that the same accommodation can be effected by substituting a pinion of different diameter and of different number of teeth or of teeth of different angle to the plane of rotation. And in all such interchanges the pinion and gear may be made to mesh properly by utilizing the rotative and sliding adjustments of the knuckle spindle and of the spindle stem of the journal bearing of the pinion.

I claim:—

1. In a construction for the purpose indicated, in combination a steering wheel knuckle spindle; a gear on the steering wheel; a pinion for meshing with said gear; a journal bearing member for journaling the shaft of said gear, said journal bearing having a spindle extending off therefrom transversely to the journal bearing axis; a bracket for holding the pinion in driving relation to the gear on the steering wheel, said bracket having a split bearing for seating the journal bearing spindle with longitudinal and rotative adjustability in said split bearing; said bracket having also a half bearing whose axis is transverse to and laterally offset from that of said split bearing; a mated half bearing member adapted to be applied in mated relation to the half bearing of said bracket for clamping the knuckle spindle, and means for clamping the split bearing and the mated half bearings respectively upon the spindle of the pinion journaling member and the knuckle spindle.

2. In the construction defined in claim 1, the gear on the steering wheel being of spiral toothed type, having the teeth at the upper and lower sides trending obliquely with respect to the fore-and-aft direction, whereby the rotative adjustment of the bracket about the knuckle spindle operates to position the journal bearing and pinion axis at any desired angle of obliquity to the plane of rotation of the gear on the steering wheel, to accommodate to each other the oblique trend of the spiral teeth of the gear and the trend of the teeth of differing obliquity of interchangeable pinions.

3. In combination with a steering knuckle spindle, a gear on the steering wheel, a pinion to be driven by said gear and a journal bearing member for journaling the pinion shaft; a bracket mounted slidably and rotatably on the knuckle spindle having a laterally offset transversely extending slide bearing, the pinion journal bearing member having a transversely extending spindle slidably and rotatably seated in said transverse bracket bearing, and means for securing each of said slidable and rotatable parts at adjusted position in their respective seats.

4. In combination with a steering knuckle spindle and the like, a gear on the steering wheel; a pinion for meshing with the said gear; a journal bearing member for the pinion shaft; a bracket for holding the pinion in driving relation with the gear, said bracket having a split and clampable bearing for slidable and rotatable adjustment on the knuckle spindle; and having also a split and clamped bearing laterally offset from and transverse to the first mentioned split bearing, the pinion journal bearing member having a spindle extending transversely to the pinion axis said spindle being slidably and rotatably seated in said split bearing, and means for clamping said split bearings on said spindles respectively.

5. In the construction defined in claim 4, the split and clampable bearing on the knuckle spindle being split in two, forming separable mated clamp members, with one of which the other of said split and clampable members is integral.

In testimony whereof, I have hereunto set my hand at Chicago, Illinois, this 13th day of February, 1926.

FREDERIK G. WHITTINGTON.